United States Patent [19]
Jarmusz et al.

[11] Patent Number: 5,108,120
[45] Date of Patent: Apr. 28, 1992

[54] MOBILE RECYCLING CART

[76] Inventors: Donna F. Jarmusz, 290 Winding Creek Dr., Naperville, Ill. 60565; Felix N. Fidelibus, 2 Poplar St., Port Chester, N.Y. 10573

[21] Appl. No.: 686,516

[22] Filed: Apr. 17, 1991

[51] Int. Cl.⁵ .................................................. B62B 3/10
[52] U.S. Cl. .................................. 280/47.2; 211/126; 280/47.33; 280/79.3
[58] Field of Search ............... 280/47.26, 47.2, 47.16, 280/79.3, 47.33, 47.35, 47.31; 211/126, 186

[56] References Cited

U.S. PATENT DOCUMENTS

| | | |
|---|---|---|
| 3,008,726 | 11/1961 | Vachon .................. 280/47.33 X |
| 3,111,333 | 11/1963 | Marini et al. ............. 280/47.26 X |

FOREIGN PATENT DOCUMENTS

| | | |
|---|---|---|
| 0654493 | 6/1963 | Italy ........................... 211/126 |
| 1565091 | 4/1980 | United Kingdom ............ 280/47.2 |

OTHER PUBLICATIONS

"Cooper Materials Handling", 1984-85 Catalog, p. 95.

*Primary Examiner*—David M. Mitchell
*Attorney, Agent, or Firm*—Abdallah & Muckelroy

[57] ABSTRACT

A mobile recycling cart having a plurality of vertically stacked selectively-removable shelves on which are selectively stored a number of waste materials baskets. The baskets are removable from the cart and may be manually carried to a recycling source in a home or an office and then returned to the cart. Alternately, the cart may be wheeled to and left at curbside for pick-up of the recyclables. The cart is simple to assemble, easy to use and completely safe, when properly used.

7 Claims, 3 Drawing Sheets

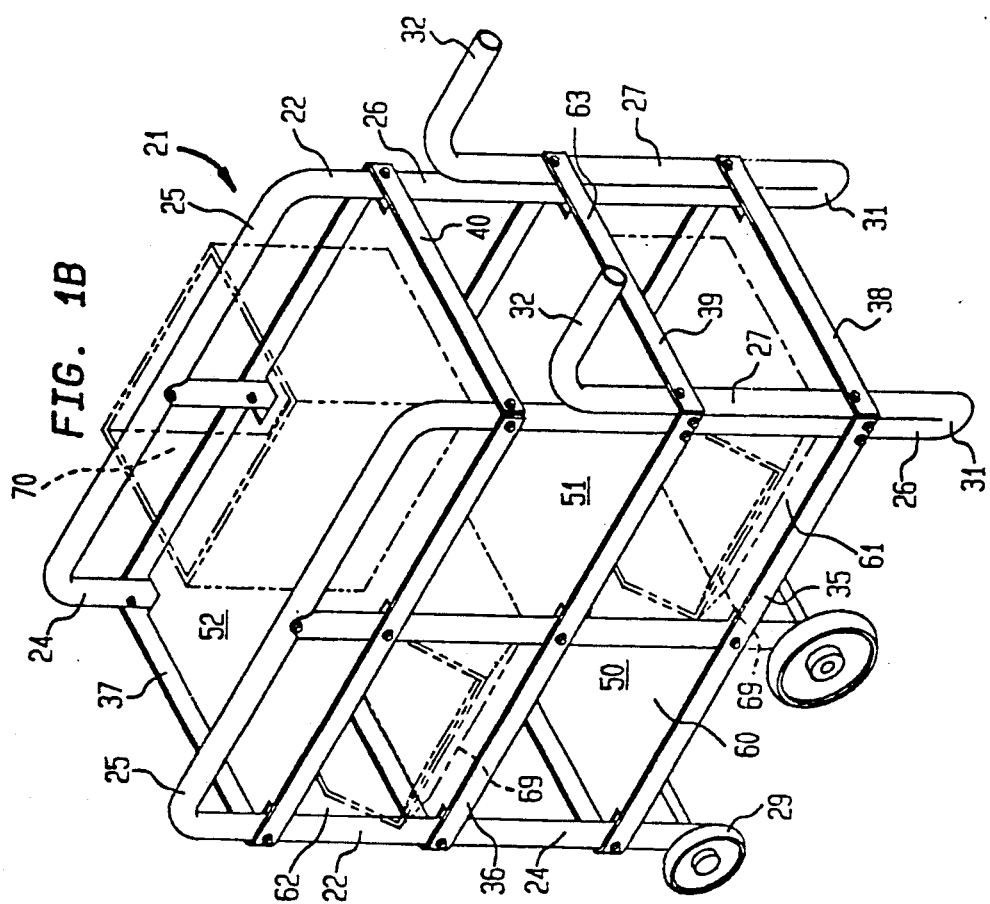
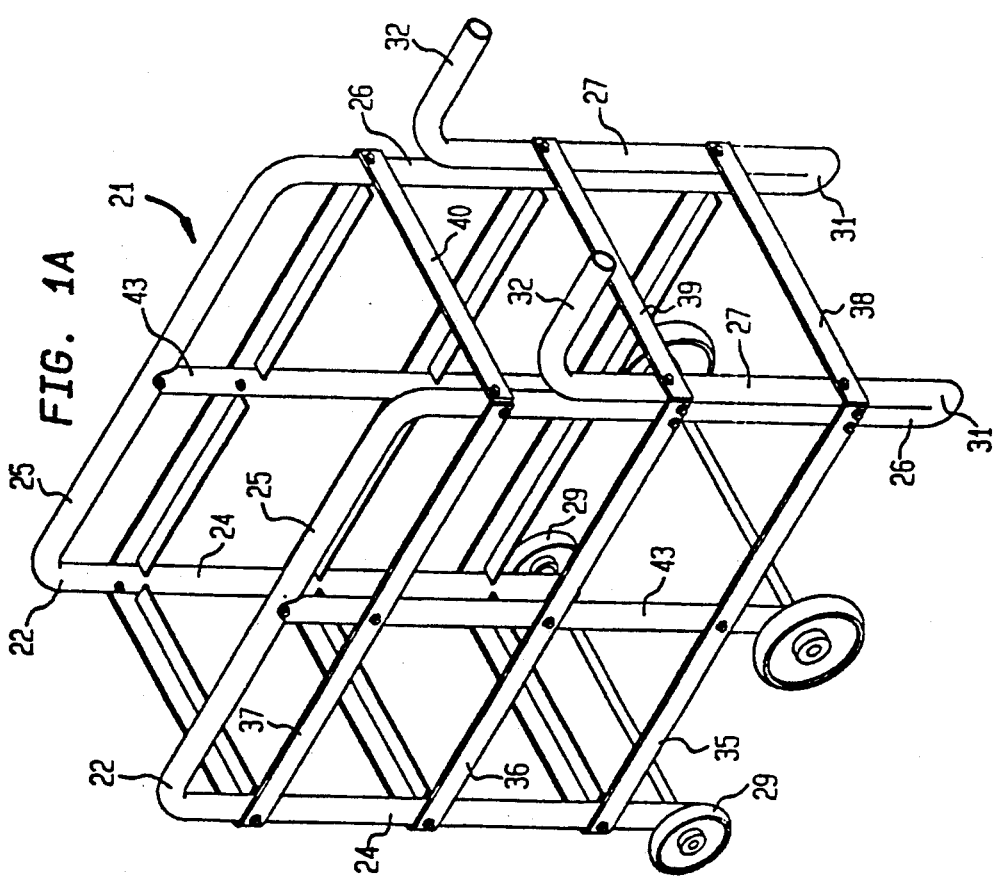

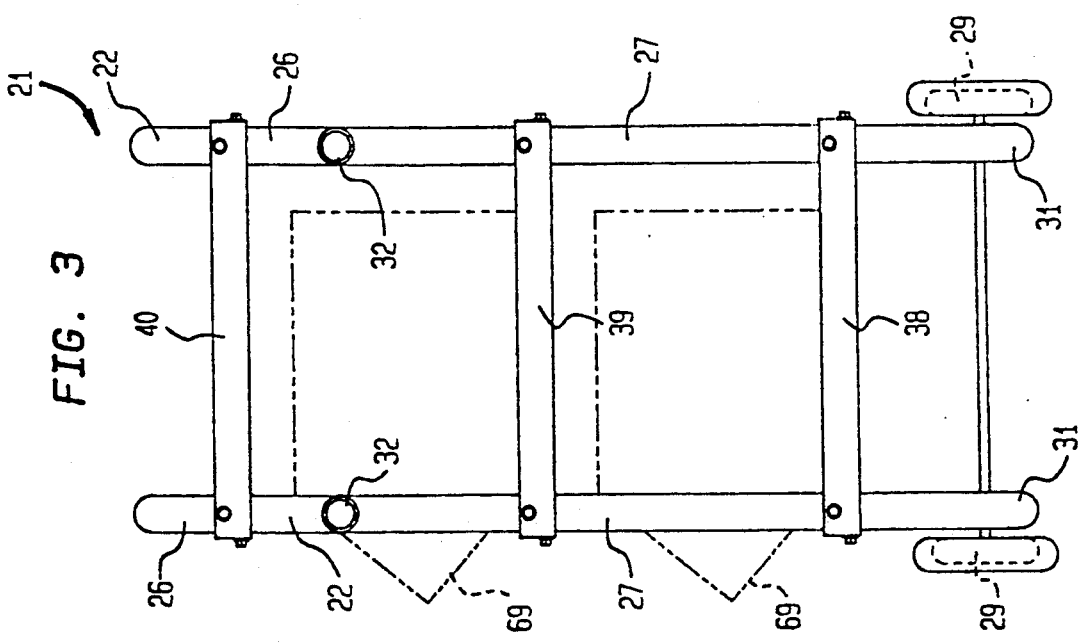
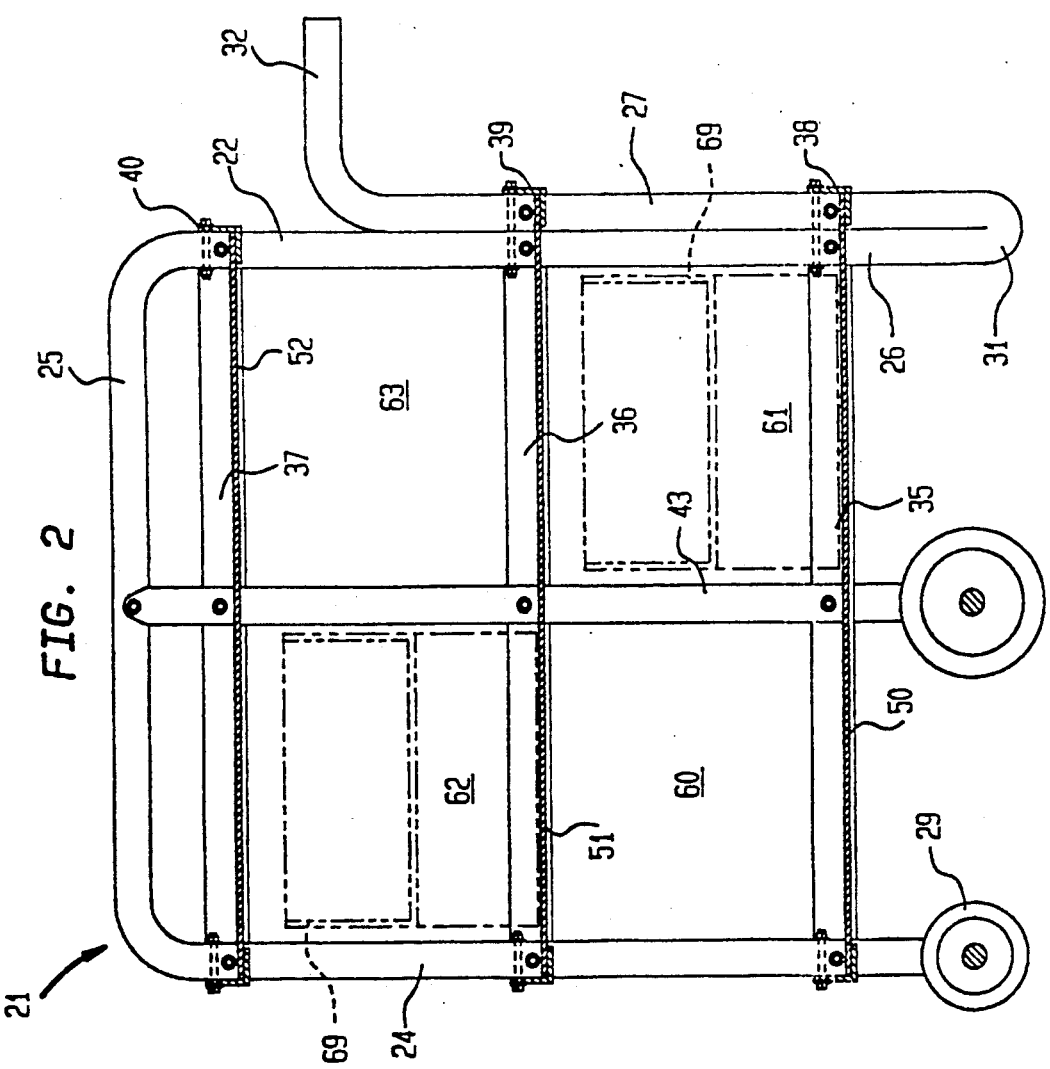

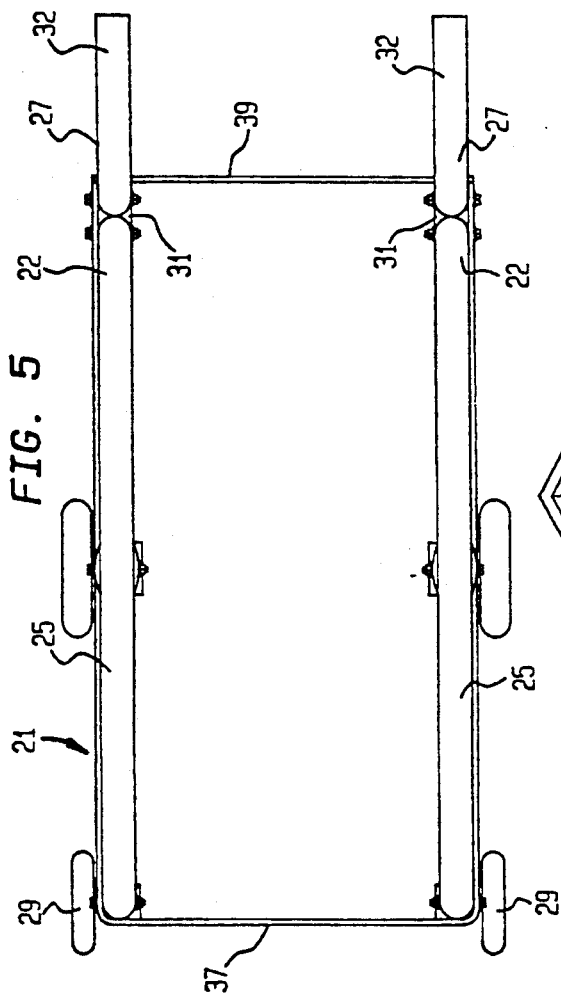
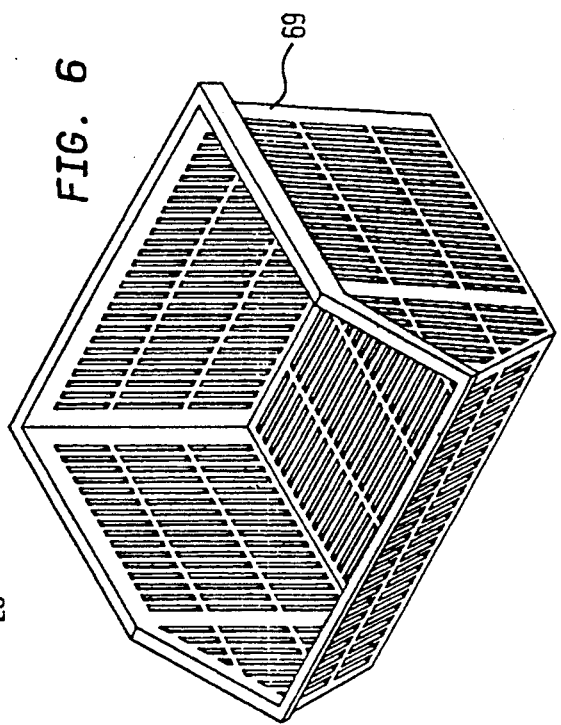
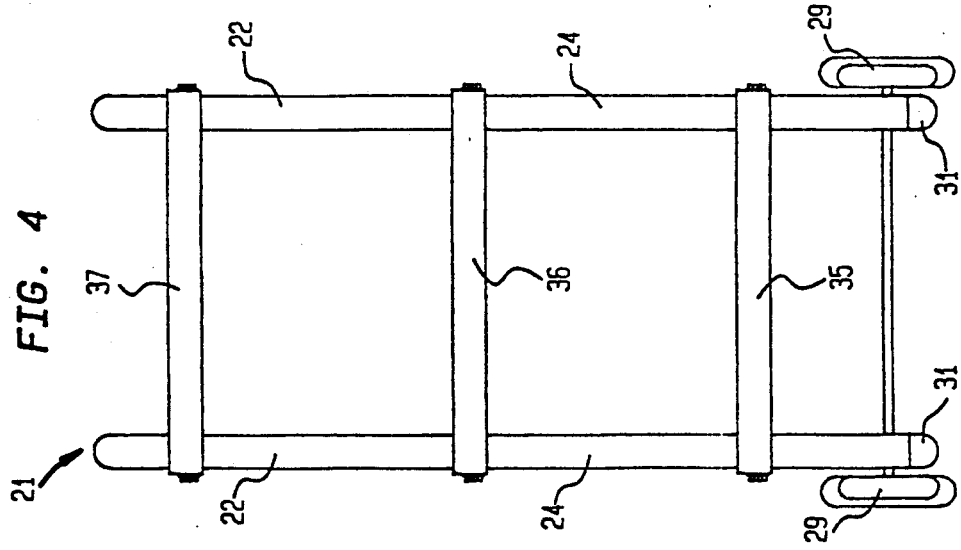

MOBILE RECYCLING CART

BACKGROUND OF THE INVENTION

1. Field of the Invention

The present invention relates to apparatus for use in recycling waste materials. More particularly, it relates to mobile carts with removable receptacles for sorting, storing and transporting recyclable materials.

2. Description of the Prior Art

The use of mobile carts for use in transporting one or more receptacles from a recycling collection point to a recycling pick-up point is known. One typical prior-art recycling cart comprises a U-shaped, tubular frame supported by a number of wheels or swivel casters. The frame forms a support on which the waste materials receptacles are removably placed. While supported by the frame, the receptacles are available to receive recyclables. After the receptacles are full or at some other predetermined time, the cart is simply wheeled to a nearby designated pick-up point, such as curbside, for collection of the sorted recyclables. Although such devices have served the purpose, they have not proved entirely satisfactory under all conditions of service for the reason that in many situations consumers have found it difficult to handle and transport the individual receptacles when they are full. Also, most prior art recycling carts do not have provision for sorting a large variety of different types of recyclable items. Further, such prior art devices often fail to provide sufficient ease and convenience for those users who may wish to transport the loaded receptacles to distant recycling centers for drop-off.

SUMMARY OF THE INVENTION

To alleviate these problems of the prior art, the present invention includes a mobile cart having plurality of vertically-spaced shelves on which are stored a number of removable, waste materials baskets. The baskets may be easily removed from the cart and manually carried to a recycling source in a home or office and then returned to the cart. The cart may be easily rolled to curbside for pick-up of the recyclables, or the baskets may be removed from the cart and transported by the user in a motor vehicle to a recycling center. The versatile cart of the present invention is simple to assemble, easy to use and completely safe, when properly used.

More specifically, the present invention includes a mobile recycling cart having a frame with a plurality of legs on which at least two wheels are mounted. Handle means are connected to the frame for permitting manual tilting of the frame onto the wheels. A plurality of shelves, supported by brackets fixed to the frame, are vertically spaced on the cart. A number of receptacles are removably placed on the shelves.

The exact nature of this invention as well as other objects and advantages thereof will be readily apparent from consideration of the following specification relating to the annexed drawings.

BRIEF DESCRIPTION OF THE DRAWINGS

FIG. 1A is a perspective view of a partially assembled version of the preferred embodiment.

FIG. 1B is a perspective view of the preferred embodiment with waste material receptacles shown in phantom.

FIG. 2 is a side view in cross section of the preferred embodiment shown in FIGS. 1A and 1B.

FIG. 3 is a rear view in elevation of the preferred embodiment.

FIG. 4 is a front view in elevation of the preferred embodiment.

FIG. 5 is a top view of the preferred embodiment.

FIG. 6 is a pictorial view of a basket for use in the preferred embodiment.

DETAILED DESCRIPTION OF THE PREFERRED EMBODIMENT

Referring now to the drawings, there is shown a cart 21 having two tubular, inverted U-shaped frames 22. Frames 22 each include a front leg 24, an upper cross bar 25, a rear leg 26 and a handle 27. The lower end of front legs 24 have wheels 29 mounted thereon. The tubular frames 22 are preferably formed from a single piece of tubular metal, such as aluminum. A pair of simple ninety degree bends separate the legs 24, 26 from the cross bar 25. The handle 27 is formed by making a 180 degree bend at the lower end of leg 26, thereby forming skids 31 on which the cart 21 rests. The upper ends of handles 27 have ninety degree bends that form horizontal hand pieces 32. As is clear from the drawings, the frames 22 are of identical construction. To maximize cart stability, the wheels 29, also of identical construction, are preferably mounted on the legs 24 so as to be located on the outside of the cart 21.

The frames 22 are joined by three shelf brackets 35, 36, 37 that extend around the exterior of the sides and front of cart 21 in a U-shaped configuration. Three straight shelf brackets 38, 39, 40, fixed at their ends to frames 22, extend across the rear of cart 21. The brackets 35–40, preferably fabricated from L-shaped angle irons, are fixed to the frames 22 with bolts that pass through appropriate openings in the tubular legs 26 and handles 27. The respective U-shaped shelf brackets 35, 36, 37 in combination with respective straight shelf brackets 38, 39, 40 provide bearing support for shelves 50, 51, 52, as hereinafter described in greater detail and more particularly shown in FIG. 2, to vertically-spaced horizontal shelf supports.

A pair of identical center posts 43 are joined at their upper ends to the center of cross bars 25. The shelf brackets 35–37 are also bolted to the posts 43 to retain the posts 43 in vertical positions on each side of the cart 21. Four compartments 60, 61, 62, 63 are defined by the shelves 50, 51, 52 and the center posts 43 (FIG. 2). Posts 43 have wheels 30 mounted thereon of similar dimensions and are larger than wheels 29.

Flat rectangular shelves 50, 51, 52, preferably made from thin plastic or metal material, are placed on the brackets 35–40 (FIG. 1B). Shelves 50–52 act as supports for receptacles that are placed in the four compartments 61, 62, 63 or on the top of the uppermost shelf 52. Shelves 50–52 may be placed on each of the brackets 35–40 as shown in FIGS. 1B and 2, or on selective vertically-spaced horizontal shelf supports. By placing only the middle shelf 51 and the lower shelf 50 in the respective shelf supports, for example, tall recyclable waste material, such as oversized glass bottles can be put into a receptacle on the middle shelf 51. Shelves 50, 51, 52 may also be formed to extend partially across a shelf support to leave open space for oversized waste materials.

FIG. 6 illustrates a perforated basket 69 for use as a receptacle to be placed in the lower compartments 63-63. Basket 69 has an open top, vertical sides, a vertical back and a tilted front face which provides an opening into which the recyclables may be deposited when the basket is mounted in the compartments 60-63 (FIGS. 1B, 3). The baskets 69 are shaped to receive and sort irregular items such as aluminum cans, glass of various colors, plastic, etc. The upper shelf 52 is used to support a receptacle 70 (FIG. 1B) which may receive such items as cardboard, newspapers, containers of used motor oil, etc. Of course, properly bundled newspapers may also be placed directly on upper shelf 52 without the need for the receptacle 70.

It should now be clear that the cart 21 has a number of features that make it easy to fabricate, package, ship, assemble and use. The various parts that make up cart 21 are similarly shaped and sized for ease in manufacturing and shipping. The parts can be formed from conventional tubular, flat and angled stock. The parts can be easily assembled by a consumer with only a few easy-to-use tools. When the cart 21 is in use and fully loaded, one or two users can readily grasp the hand pieces 32, lift the rear end of cart 21 until skids 31 are free and roll the cart 21 with ease.

Recyclables may be easily deposited in the baskets 69 while they are mounted on the cart 21. The type and amount of waste materials that has already been deposited in a particular basket 69 is easily visible to the exterior for viewing by a user and/or waste collector. The cart 21 will neatly store sorted recyclables at curbside in a manner that reduces the possibility of accidental spillage. Skids 31 will act as brakes to prevent inadvertent cart runaway due to high winds or the like. Still further, the baskets 69 and receptacles 70 are conveniently arranged to be removable from the cart 21 so that they may be carried about a home or office or, when loaded, they may be readily transported in a motor vehicle to a distant recycling center.

Obviously many modifications and variations of the present invention are possible in the light of the above teachings. It is therefore to be understood, that within the scope of the appended claims, the invention may be practiced otherwise than as specifically described.

I claim:

1. A mobile recycling cart comprising:
   a frame having first and second vertical front legs and first and second vertical rear legs;
   wheels mounted at the lower ends of said front legs;
   first and second handles integrally formed with the lower ends of said first and second rear legs, respectively, and extending therefrom at a 180° bend therefrom to form skids on which said cart may rest;
   a plurality of shelf brackets fixed to said legs at spaced vertical positions; and
   shelves removably mounted on said brackets.

2. The cart of claim 1 further including perforated baskets removably mounted on said shelves.

3. The cart of claim 2 wherein said baskets have tilted sides that extend beyond said frame for providing access to the interior of said baskets.

4. The cart of claim 1 wherein said first front and rear legs are joined at their upper ends by a first integrally-formed horizontal cross bar and said second front and rear legs are joined at their upper ends by a second integrally-formed horizontal cross bar.

5. The cart of claim 4 wherein said first front and rear legs, cross bar and handle are formed from a single tubular member, and said second front and rear legs, cross bar and handle are formed from a single tubular member.

6. The cart of claim 5 wherein said shelf brackets are formed from rigid members having L-shaped cross sections.

7. A mobile recycling cart comprising:
   first and second bent frame members;
   first, second and third U-shaped shelf brackets fixedly attached to outside and forward portions of the respective frame members and disposed in vertically-spaced relationship, said U-shaped shelf brackets having an L-shaped cross section, a leg of the respective U-shaped shelf brackets being inwardly disposed horizontally;
   first, second and third straight shelf brackets respectively disposed in horizontal alignment with the respective first, second and third U-shaped shelf brackets and fixedly attached to rearward portions of the respective frame members in vertically-spaced relationship, said straight shelf brackets having an L-shaped cross section, a leg of the respective straight shelf brackets being inwardly disposed horizontally, said U-shaped shelf brackets and said straight shelf brackets, in combination, providing a plurality of shelf support means in vertically-displaced relationship;
   at least one flat shelf selectively supportable in bearing engagement on the respective shelf support means,
   said bent frame members being respectively formed having a first vertical front leg, a second vertical rear leg, said first and second vertical legs being joined by a horizontal cross bar integrally formed with respective upper ends of said first vertical front leg and said second vertical rear leg, said bent frame members further respectively being formed having a handle integrally formed with a lower end of the rear leg and extending therefrom at a 180° bend to form respective skids on which the cart may rest.

* * * * *